United States Patent
Petrenko et al.

(10) Patent No.: US 7,876,022 B2
(45) Date of Patent: Jan. 25, 2011

(54) PIEZOELECTRIC GENERATOR OF MECHANICAL VIBRATIONS, AND PIEZOELECTRIC MOTORS BASED ON THE GENERATOR

(75) Inventors: Serhiy Petrenko, Kiev (UA); Vyacheslav Lavrinenko, Kiev (UA); Vitalii Koval, Kiev (UA)

(73) Assignee: Discovery Technology International, LLLP, Sarasota, FL (US)

( * ) Notice: Subject to any disclaimer, the term of this patent is extended or adjusted under 35 U.S.C. 154(b) by 0 days.

(21) Appl. No.: 12/463,524

(22) Filed: May 11, 2009

(65) Prior Publication Data

US 2009/0212661 A1      Aug. 27, 2009

Related U.S. Application Data

(63) Continuation-in-part of application No. PCT/UA2007/000054, filed on Sep. 13, 2007.

(30) Foreign Application Priority Data

Nov. 9, 2006    (UA) ............................ A 2006 11804

(51) Int. Cl.
    *H01L 41/08* (2006.01)
(52) U.S. Cl. .............................. 310/323.03; 310/323.02
(58) Field of Classification Search ................................ 310/323.03–323.09
    See application file for complete search history.

(56) References Cited

U.S. PATENT DOCUMENTS

| | | | |
|---|---|---|---|
| 4,400,641 A | 8/1983 | Vishnevsky et al. | |
| 4,453,103 A * | 6/1984 | Vishnevsky et al. | 310/323.02 |
| 4,959,580 A | 9/1990 | Vishnevsky et al. | |
| 6,867,532 B2 * | 3/2005 | Brady et al. | 310/323.02 |
| 7,405,508 B2 * | 7/2008 | Petrenko | 310/317 |
| 2002/0017831 A1 * | 2/2002 | Iarochenko et al. | 310/323.03 |
| 2002/0033651 A1 | 3/2002 | Iarochenko et al. | |
| 2005/0012433 A1 | 1/2005 | Brady et al. | |
| 2009/0121586 A1 * | 5/2009 | Kesil | 310/323.02 |
| 2009/0212661 A1 * | 8/2009 | Petrenko et al. | 310/323.02 |

FOREIGN PATENT DOCUMENTS

WO    WO-9210874    6/1992

* cited by examiner

*Primary Examiner*—Mark Budd
(74) *Attorney, Agent, or Firm*—Fox Rothschild, LLP; Robert J. Sacco

(57) ABSTRACT

A piezoelectric generator includes a piezoelectric ring having upper and lower plane surfaces and a first quality factor (Q-factor), a sound-wave conducting gasket acoustically coupled to the upper plane surface, a metal resonator ring positioned acoustically coupled to the conducting gasket, the metal resonator ring having a second Q-factor substantially greater than the first Q-factor, and at least one bent elastic pusher extending from a periphery of the metal resonator ring. In the generator, an external diameter of the conducting gasket is less than half of an external diameter of the metal resonator ring and the piezoelectric ring, the conducting gasket, and the metal resonator ring are concentrically aligned with respect to a rotational axis.

20 Claims, 2 Drawing Sheets

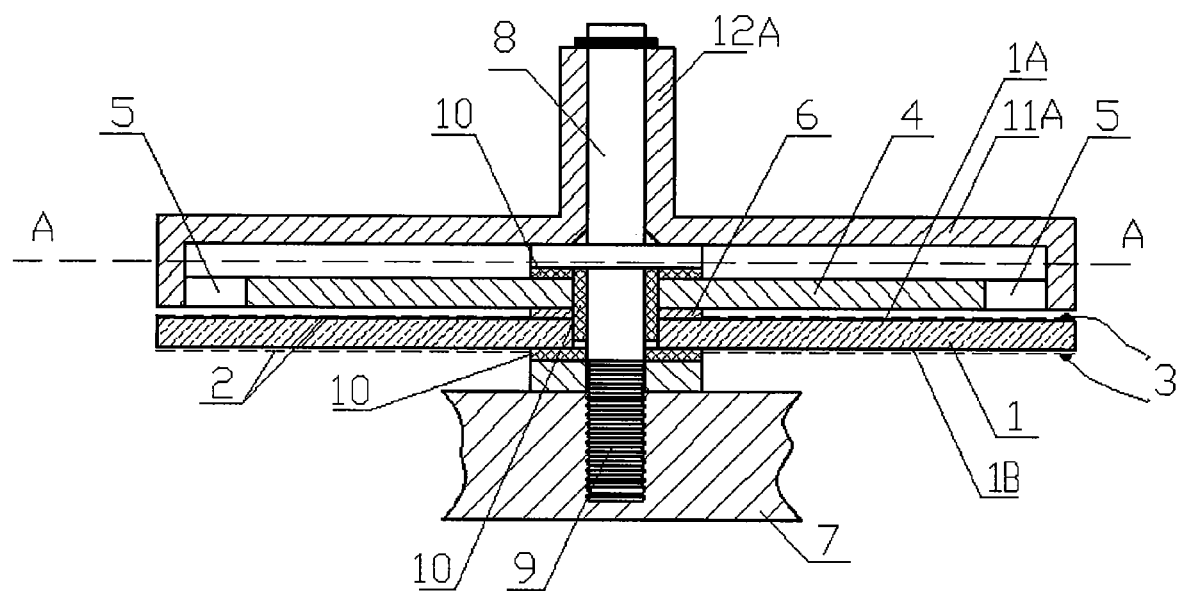
FIG. 1 100
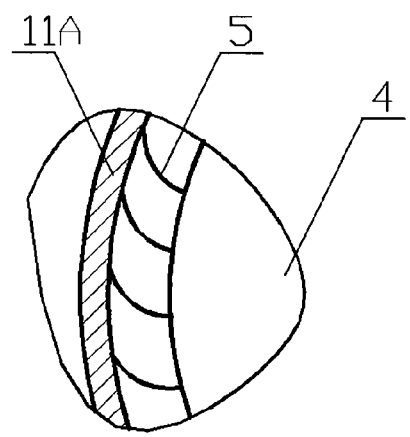
FIG. 2

PIEZOELECTRIC GENERATOR OF MECHANICAL VIBRATIONS, AND PIEZOELECTRIC MOTORS BASED ON THE GENERATOR

CROSS REFERENCE TO PRIOR APPLICATIONS

This application is a continuation-in-part of International Application No. PCT/UA2007/000054, filed Sep. 13, 2007, which claims the benefit of UA20060011804, filed Nov. 9, 2006. The disclosures of both of these related applications are incorporated herein by reference in their entireties.

FIELD OF THE INVENTION

The invention is related to the field of piezoelectric motors, and more particularly to piezoelectric motors based on piezoelectric generators of mechanical vibrations.

BACKGROUND

In general, piezoelectric generators of mechanical vibrations using acoustic frequencies extending into the ultrasonic region are the basis of piezoelectric motors. In such motors, the operating frequency of the generator (and the output power of the motor) is controlled using standard pulsed current circuits. The generator is typically part of a sound-proof stator and assembled with a suitable mechanical transmission system to drive the rotor. In general, such generators are made in the form of a flat three-layer ring. The middle layer is typically a piezoelectric core, which is generally polarized at right angles with respect to its two planar surfaces. The upper and lower layers on either side of the core are typically made from electrically conductive coatings which act as electrodes and to which are attached conductors for supplying current pulses from a current source external to the motor. When electric current pulses are applied to the electrodes, vibrations in the piezoelectric core are set-up in the radial direction, causing the radius of the core to vary at one of its natural vibration frequencies.

In such piezoelectric motors, the efficiency typically depends on two factors: (1) the suitability of the piezoelectric generator for operating in resonance mode over a prolonged period of time; and (2) the ratio of energy stored in the system to that dissipated per cycle of oscillation, i.e., the quality factor (Q-factor) of the resonant system. With respect to (1), it is generally acknowledged that acoustic resonant vibrations in solid state materials can lead to a break-up of the materials depending upon their elasticity. Thus the lower the elasticity, the more brittle the material and the more likely it is to break up when subject to prolonged vibration at acoustic resonance. Unfortunately, most piezoelectric materials are very brittle over a wide temperature range.

With respect to (2), piezoelectric generators of radial mechanical vibrations can have Q-factors in the range from 10 to 100. However, when such generators are adapted to compensate for the brittle nature of piezoelectric materials, the Q-factors are typically limited. For example, the use of restraining hoops typically causes the Q-factor of piezoelectric generators to not exceed 10. As a result, piezoelectric motors incorporating such generators generally are limited to slow speeds (a few revolutions per minute) and angular resolutions down to a few angular minutes. In another example, use of a complementary metal resonator generally limits Q-factor to values less than 100. Although, metal resonators, when vibrated, can provide a Q-factor in excess of 100, the piezoelectric elements typically available cannot vibrate such resonators effectively. As a result, any piezoelectric motor based on this type of generator generally exhibits angular speeds of no more than tens of revolutions per minute and angular resolution of no less than one angular minute.

SUMMARY OF THE INVENTION

Embodiments of the invention are directed to piezoelectric generators and motors therefrom. In a first embodiment of the invention, a piezoelectric generator is provided. The generator includes a piezoelectric ring having upper and lower plane surfaces and a first quality factor (Q-factor), a sound-wave conducting gasket acoustically coupled to the upper plane surface, a metal resonator ring positioned so that it is acoustically coupled to the conducting gasket, the metal resonator ring having a second Q-factor substantially greater than the first Q-factor, and at least one bent elastic pusher extending from a periphery of the metal resonator ring. In the generator, the external diameter of the conducting gasket is less than half of the external diameter of the metal resonator ring, and the piezoelectric ring, the conducting gasket, and the metal resonator ring are concentrically aligned with respect to a rotational axis.

In a second embodiment of the invention, a piezoelectric motor is provided. The motor includes a support and a stator extending from the support and defining a rotational axis. The motor also includes a piezoelectric generator rigidly coupled to the stator, comprising a piezoelectric ring having upper and lower plane surfaces and a first quality factor (Q-factor), a sound-wave conducting gasket acoustically coupled to the upper plane surface, a metal resonator ring acoustically coupled to the conducting gasket, the metal resonator ring having a second Q-factor substantially greater than the first Q-factor, and one or more bent elastic pushers extending from a periphery of the metal resonator ring. The motor further includes a rotor rotatably and mechanically coupled to the stator, the rotor having an inner circumferential surface. In the motor, the external diameter of the conducting gasket is less than half of the external diameter of the metal resonator ring, and the piezoelectric ring, the conducting gasket, and the metal resonator ring are all concentric to the rotational axis. Also the bent elastic pushers contact the rotor's inner circumferential surface, and the stator and its support are acoustically isolated from the piezoelectric generator.

In a third embodiment of the invention, a piezoelectric motor is provided. The motor includes a support, a stator extending from the support and defining a rotational axis, a first piezoelectric generator rigidly coupled to the stator and having one or more first bent elastic pushers extending radially with respect to the rotational axis, an output shaft rotatably and mechanically coupled to the stator, a second piezoelectric generator rigidly coupled to the output shaft and having one or more second bent elastic pushers extending radially with respect to the rotational axis, and a frictional coupler rotatably and mechanically coupled to the output shaft, the coupler having an upper inner circumferential surface and a lower inner circumferential surface. In the motor, each of the first and the second piezoelectric generators comprises a piezoelectric ring having upper and lower plane surfaces and a first quality factor (Q-factor), a sound-wave conducting gasket acoustically coupled to the upper plane surface, and a metal resonator ring acoustically coupled to the conducting gasket having an external diameter of less than half of the external diameter of the metal ring resonator, and having a second Q-factor substantially greater than the first Q-factor. Furthermore, the piezoelectric ring, the conducting gasket, and the metal resonator ring in each of the first and second piezoelectric generators are concentrically aligned with respect to the rotational axis, and the stator and the support are acoustically isolated from the first and second piezoelectric generators.

BRIEF DESCRIPTION OF THE DRAWINGS

The invention is further explained in the description of the proposed piezoelectric generator and piezoelectric motors and their operation with reference to the enclosed drawings, where:

FIG. 1 shows a cross-sectional side view of a piezoelectric motor in accordance with an embodiment of the invention.

FIG. 2 shows a portion of a cross-sectional top-down view of the motor in FIG. 1 along cutline A-A, showing the pushers situated on the periphery of the complementary metal resonator and the contact area of the pushers with the inner wall of the rotor.

DETAILED DESCRIPTION

Figure 3:
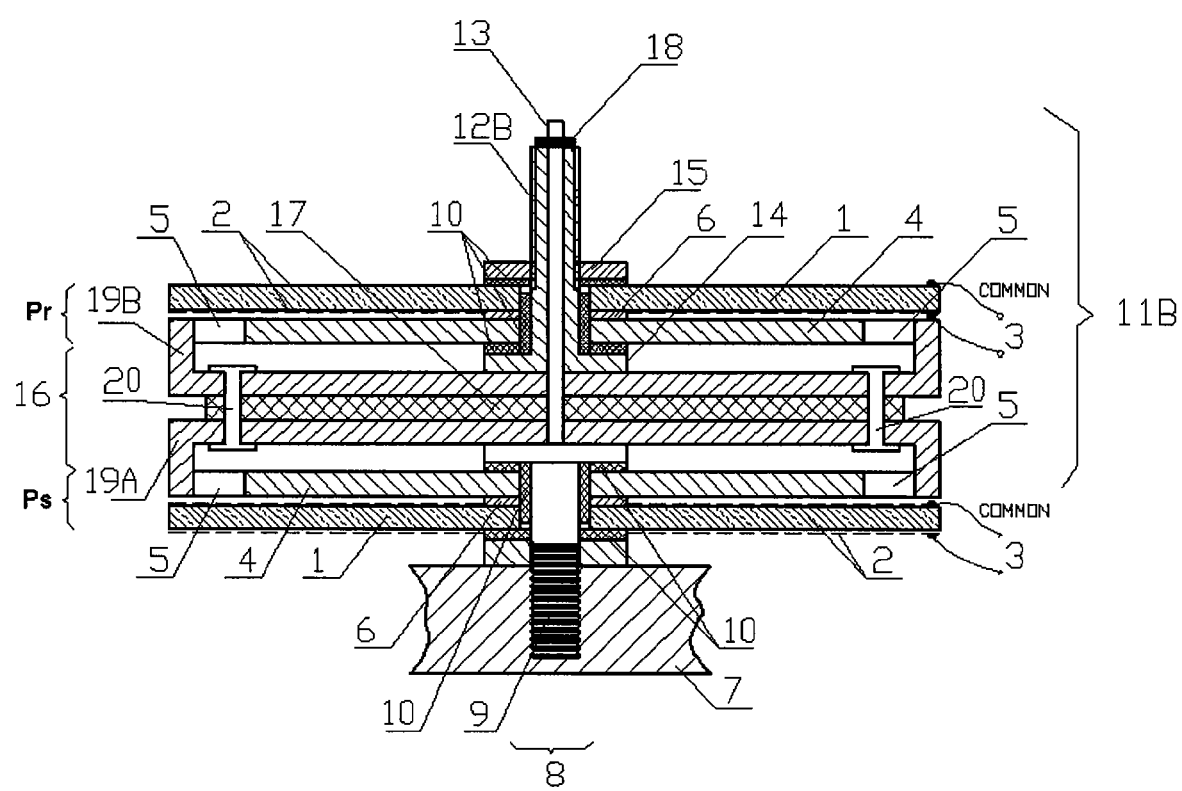
FIG. 3 shows a cross-sectional view of a reversible piezoelectric motor based on using two piezoelectric generators and a common rotor in accordance with another embodiment of the invention.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts can occur in different orders and/or concurrently with other acts or events. Furthermore, not all illustrated acts or events are required to implement a methodology in accordance with the invention.

Embodiments of the invention provide a new design for a piezoelectric generator and motors therefrom, including an improved interface between an active piezoelectric source of radial mechanical vibrations and a complementary metal resonator. Such designs provide piezoelectric generators and motors with high Q-factors and, accordingly, with increased operating speed, improved angular resolution, and efficiency.

In the various embodiments of the invention, a piezoelectric generator includes an active source of radial mechanical vibrations. In particular, a flat ring comprising a piezoelectric material which is polarized at right angles with respect to the ring's two planar surfaces, and having thin electrode layers extending over each of the two planar surfaces. The electrode layers each include a means of connection to an external electrical pulse current source. The piezoelectric generator also includes a complementary flat ring metal resonator with a relatively large mechanical vibration Q factor (~1000). The metal resonator is disposed on one of two planar surfaces using a sound-conducting gasket placed between the metal resonator and one of the electrode layers, where the external diameter of the gasket does not exceed half of the external diameter of the complementary resonator.

In a piezoelectric generator in accordance with an embodiment of the invention, the dimensions and mass of the active source of radial mechanical vibrations are selected according to the dimensions and mass of the complementary metal resonator. As a result of correctly dimensioning these corresponding components, a significant portion of the energy of the mechanical vibrations generated by the active source of vibrations is used in generating acoustic vibrations in the complementary resonator. As a result, a piezoelectric generator in accordance with an embodiment of the invention provides a Q-factor at or close to 1000, which substantially improves the response time and angular resolution of piezoelectric motors including such generators, as compared to conventional piezoelectric motors.

As described above, one aspect of the invention is the relative geometrical dimensions of the active source of radial mechanical vibrations and complementary metal resonator. Furthermore, another aspect of the invention is selecting these dimensions, taking into consideration the density and elasticity of the materials from which they are made, such that the zero-order modes of radial vibrations in the source and complementary resonators are substantially identical. By providing a zero-order mode of vibration, the maximum possible amplitude of radial vibration of the complementary metal resonator can be achieved.

In some embodiments of the invention, the natural frequency of the complementary metal resonator ($F_{cmr}$) and the natural frequency of the active source of radial mechanical vibrations ($F_{as}$) can be selected to practically coincide at the zero-order vibrational mode. This condition yields the maximum possible efficiency of the piezoelectric generator. However, in other embodiments of the invention, a design can be provided in which the outside dimension of the complementary metal resonator and the active source of radial mechanical vibrations are the same. This results in the natural frequency ($F_{cmr}$) of the complementary metal resonator exceeding the natural frequency of the active source of radial mechanical vibrations ($F_{as}$) at the zero-order vibrational mode by some amount $\Delta F$. In such embodiments, $\Delta F$ is in the range from 10 kHz to 20 kHz. Selecting this configuration, rather than precisely matching natural frequencies, simplifies the design of the motor and improves the reliability of the motor despite a slight decrease in efficiency. Accordingly, the configuration of the complementary metal resonator and the active source can be selected to satisfy the following conditions:

$$|F_{cmr} - F_{as}| < 20 \text{ kHz.} \quad (1)$$

As described above, another aspect of the invention is the design of the sound conducting gasket. In the various embodiments of the invention, the width ($b_g$) of the sound-conducting gasket, the width ($B_{pr}$) of the flat ring piezoelectric source of vibration, and the width ($B_{cmr}$) of the complementary metal resonator's ring in the radial direction are selected to satisfy the following conditions:

$$3b_g \leq B_{pr}, \text{ and } 3b_g \leq B_{cmr}. \quad (2)$$

Additionally, the diameters of the centering holes in all these three parts can be selected to be substantially the same. Realization of these conditions provides the improved transmission of the mechanical vibrations from the piezoelectric source of vibrations to the complementary metal resonator as compared to conventional piezoelectric generators.

Another aspect of the invention is the design of the active source of radial mechanical vibrations and of the complementary metal resonator. In the various embodiments of the invention, the external and internal radii of the active source of radial mechanical vibrations and of the complementary metal resonator are selected to satisfy the following condition:

$$v_{ssp}/(R_{as}+r_{as}) \approx v_{ssm}/(R_{cmr}+r_{cmr}), \quad (3)$$

where $v_{ssp}$ is the speed of sound in the piezoelectric material of the active source of radial mechanical vibrations, $R_{as}$ and $r_{as}$ are the external and internal radii of the active source, respectively, $v_{ssm}$ is the speed of sound in the material of the complementary metal resonator, and $R_{cmr}$ and $r_{cmr}$ are the external and internal radii of the complementary metal resonator, respectively. In general, the difference between the two sides of equation (3) can be less than 10%

In the various embodiments of the invention, the active source of radial mechanical vibrations can be selected from many types of piezoelectric materials. For example, the piezoelectric material can comprise, barium titanate, lead titanate, sodium tantalate, potassium tantalate, lead zirconate-titanate, lead-strontium zirconate-titanate, barium-lead zirconate-titanate, and strontium zirconate-titanate, to name a few. However, the invention is not limited solely to these materials and any other piezoelectric material capable of providing radial mechanical vibrations can be used in the various embodiments of the invention.

In one embodiment of the invention, a piezoelectric generator, as described above, can be used to provide a piezoelectric motor for uni-directional movement. Such a motor can include a support on which all other parts are assembled and a sound-proof stator that is rigidly coupled to the support, on which is mounted a stationary piezoelectric generator. The stationary piezoelectric generator can include, as described above, an active source of radial mechanical vibrations and corresponding electrodes, a complementary flat ring-like metal resonator, a flat ring sound-conducting gasket placed between the complementary flat ring metal resonator and one of the electrodes. In the motor, the metal resonator can have fitted to its periphery at least one pusher to stimulate rotation of a rotor. The pushers can be bent and elastic to specify the direction of motion. Furthermore, the motor can include a suitable means for compression of the active source of radial mechanical vibrations, the complementary flat ring metal resonator, and the flat ring sound-conducting gasket to provide an acoustically coupled stack. The motor can also include a rotor that is capable of rotation in relation to the support or the stator. The rotor can include the means to accept rotational movement, when frictionally engaged with at least one pusher located on the periphery of the complementary ring-like metal resonator, and an output shaft that is rigidly assembled to the rotor. An exemplary configuration of such a motor will be described below in greater detail with respect to FIGS. 1 and 2.

FIG. 1 shows a cross-sectional side view of piezoelectric motor 100 in accordance with an embodiment of the invention. FIG. 2 shows a portion of a cross-sectional top-down view of motor 100 in FIG. 1 along cutline A-A, showing pushers 5 situated on the periphery of complementary metal resonator 4 and the contact area of the pushers with the inner wall of the rotor. As shown in FIG. 1, motor 100 can include an active source of radial mechanical vibrations. In particular, motor 100 includes a flat piezoelectric ring 1 made from suitable piezoelectric material which is polarized at right angles to the ring's two planar surfaces 1A, 1B. As described above, flat ring 1 has two thin electrode layers 2 deposited on planar surfaces 1A, 1B. Each of electrode layers 2 includes electrode contacts 3 for connecting to a pulse current source and is mechanically and acoustically attached to one of the ring's planar surfaces 1A, 1B over their whole surface area. Electrode layers 2 can be several microns in thickness (e.g., 2-10 microns).

Motor 100 also includes a complementary flat ring metal resonator 4 which is located above flat piezoelectric ring 1 and is equipped on its periphery with at least one pusher 5, which can be used to provide stimulus for rotation of a rotor via friction. As shown in FIG. 2, multiple pushers can be used and the pusher 5 can comprise bent elastic members. The bent elastic pushers 5 are similarly oriented to apply force to the rotor 11A in a substantially same radial direction. Motor 100 can also include a flat sound-wave conducting gasket 6 placed between complementary metal resonator 4 and one of electrodes 2, where the external diameter of gasket 6 is less than half the external diameter of complementary resonator 4. The geometric dimensions, the density, and the elasticity of the flat piezoelectric ring 1, the sound-conducting gasket 6, and the metal resonator 4, are selected to meet the conditions of equations (1), (2), and (3) described above.

As shown in FIG. 1, motor 100 can also include a plate or support 7 and a sound-proof stator 8 attached to support 7. The stator 8 can include anchor bolt 9. Anchor bolt 9 can be attached to support 7 via a threaded hole in the support 7, as shown in FIG. 1, or via an unthreaded through-hole (not shown) in support 7 with an external nut (not shown). Anchor bolt 9 can also serve as a means of compression of the flat piezoelectric ring 1, the sound-conducting gasket 6, and the metal resonator 4 to form an acoustically coupled stack. Stator 8 can also include at least one sound-proof gasket 10 that acoustically separates the components of the stationary piezoelectric generator from the stator 8 and support 7. Thus, as shown in FIG. 1, the flat piezoelectric ring 1, the sound-conducting gasket 6, and the metal resonator 4 are acoustically isolated from the rest of motor 100 by gasket(s) 10.

Motor 100 can also include rotor 11A that is capable of rotating about the stator 8 and designed to accept stimuli to achieve rotational movement. For example, as shown in FIGS. 1 and 2, the rotor 11A can be cylindrically shaped and can optionally include an output shaft 12A that is mechanically attached to rotor 11A. The cylindrical section of the rotor 11A overlap the metal resonator 4 and both are engaged frictionally by at least one pusher 5 located on the periphery of the resonator 4, as described above. In motor 100, the upper extension of the anchor bolt's 9 head serves as either a slide bearing or as a support for a bearing.

Although motor 100 can include only a single pusher, the embodiments of the invention are not limited in this regard. In the various embodiments of the invention, the number of pushers 5 is selected by taking into consideration the torque requirements and the coefficient of dynamic friction of the materials of both pusher(s) 5 and walls of rotor 11A. In embodiments where two or more of pushers 5 are used, they can be spaced around the periphery of the complementary ring-like metal resonator 4 at approximately equal angular distances. That is, at angular distances varying by less than 20 arc-min. An increase in the number of pushers 5 enables better balancing of piezoelectric motor 100 and reduces the probability of any slipping of the rotor in 11A relation to the stator 8.

Motor 100 operates as follows. In response to providing excitation current pulses at contacts 3, the electrode layers 2 provide excitation voltages between the planar surfaces 1A, 1B of the flat piezoelectric ring 1. These excitation voltages can be used to induce radial mechanical vibrations in the ring along a direction parallel to the planar surfaces 1A, 1B. The sound-conducting gasket 6 transmits the mechanical vibrations of the piezoelectric ring 1 to the complementary metal resonator 4, which in turn vibrates radially. As a result, the pushers 5 located on the periphery of metal resonator 4 are bent and straightened at the same frequency as the mechanical vibrations of the complementary resonator. This varies the force the pushers 5 exert on the inner wall of the rotor 11A. The varying force applied by the similarly oriented pushers results in motion of rotor 11A and causes the rotation of output shaft 12A in one direction.

As previously described, the resulting Q-factor of a piezoelectric generator, such as that described in FIG. 1, is about 1000. Therefore, motor 100 can provide angular speeds up to several tens of revolutions per minute and angular resolutions less than 0.5 arc-sec. However, because motor 100 is equipped with a stationary piezoelectric generator (1-6), the output shaft 12 (and the rotor 11A) is capable of rotation in one direction only. Accordingly, the arrangement in FIG. 1 provides a motor which is uni-directional.

In another embodiment of the invention, a bi-directional piezoelectric motor is provided. A piezoelectric motor for bi-directional movement in accordance with an embodiment of the invention includes a support, a sound-proof stator, and a first or stationary piezoelectric generator. Such a motor also includes a sound-proof rotor with a second or rotary piezoelectric generator and an output shaft. The motor further includes a friction coupler located in the axial gap between the stator and rotor, capable of rotating or stopping in relation to said support, and constantly engaged with the pushers of both complementary ring-like metal resonators of the stationary and rotary piezoelectric generators.

In such motors, the dimensions and composition of the stationary and rotary piezoelectric generators can be configured as described above in FIG. 1. Such piezoelectric generators have a Q-factor of about 1000 and motors therefrom can provide angular speeds up to a few tens of revolutions per minute and angular resolutions less than 0.5 arc-sec in both rotational directions.

Furthermore, because the above-described motor is equipped two piezoelectric generators (stationary and rotary piezoelectric generators) coupled to the friction coupling, reversing of the direction of rotation of the output shaft can be achieved. This reversion is provided by switching-over of the pulse current source from the rotary piezoelectric generator to the stationary piezoelectric generator, and vice versa.

In such motors, the friction coupling is divided into upper, middle, and lower portions. The middle portion can include at least one sound-proof gasket to acoustically isolate the upper and lower portions. The upper and lower portions are also configured to engage frictionally with the pushers. This design of friction coupling substantially facilitates the assembly and service of the device. The design of such a motor will be described below in greater detail with respect to FIG. 3.

FIG. 3 shows a bi-direction piezoelectric motor 300 in accordance with an embodiment of the invention. Similar to motor 100, motor 300 includes a stationary piezoelectric generator Ps (including components 1-6, as described above in FIG. 1), support 7, and sound-proof stator 8 (9 and 10, as described above in FIG. 1). Stator 8 differs from the stator shown in FIG. 1 in that the head of anchor bolt 9 not only provides a slide bearing or a support for a bearing, but also includes an extension. This is shown in FIG. 3 as round centering rod 13. A sound-proof rotor 11B sits on rod 13.

Rotor 11B includes tubular output shaft 12B having fitted at its lower end supporting flange 14. The rotor 11B further includes a rotary piezoelectric generator Pr, configured similarly to stationary piezoelectric generator Ps (also including components 1-6). All parts of generator Pr are stacked on the flange 14 and are compressed to form an acoustically coupled stack. For example, a nut 15 screwed on the threaded portion of the tubular output shaft 12B can provide the compression. The lower part of the flange 14 serves as a slide bearing or as a support for such bearing. Nut 15 and tubular output shaft 12B are separated acoustically from generator Pr by soundproof gaskets 10. The tubular output shaft 12B is prevented from sliding off the centering rod 13 by using, for example, a nut 18 screwed on the threaded end of the rod 13.

As shown in FIG. 3, rotor 11B also includes frictional coupler 16 between generators Ps and Pr. Coupler 16 comprises upper and lower contact portions 19A, 19B, for contacting each of generators Ps and Pr, respectively, and a sound-proof gasket 17 between them to provide for some acoustic isolation of 19A and 19B. As shown in FIG. 3, the portions 19A, 19B and the gasket 17 can be a composite sub-assembly, held together by fasteners 20. Different types of fasteners can be used. For example, rivets, screws, or bolts, to name a few. However, in some embodiments of the invention, a frictional coupler can comprise a one-piece component (i.e., without fasteners) that includes a sound-proof portion positioned similarly to gasket 17 in coupler 16.

In operation, each of generators Ps and Pr operate as described above in relation to FIG. 1. In motor 300 generators Ps and Pr operate in turns, depending on the demanded direction of rotation. To provide motion in a first direction, generator Ps can be excited, causing the pushers 5 of the metal resonator 4 to interact with lower contact portion 19A. As described explained above, contact portions 19A and 19B are mechanically coupled. Furthermore, generator Pr and output shaft 12B are also mechanically coupled. Additionally, since generator Pr is not excited, the elastic bent pushers 5 of the metal resonator 4 in generator Pr are frictionally coupled with upper contact portion 19B. As a result of the excitation of generator Ps, the combination of this frictional and mechanical coupling causes not only the coupler 16 to rotate about the centering rod 13, but also causes rotation of the generator Pr and tubular output shaft 12 in a first direction (e.g., forward).

Disconnection of generator Ps from the pulse current source stops the rotation of the tubular output shaft 12, since the frictional coupling between generators Ps and Pr and contact portions 19A and 19b, respectively, holds rotor 11B in a fixed position. In particular, pushers 5 of the metal resonator 4 in generator Ps hold coupler 16 fixed in relation to the stator 8 and the support 7 and pushers 5 of the metal resonator 4 in generator Pr hold generator Pr and output shaft 12 fixed in relation to the stator 8 and the support 7.

To provide reverse motion, generator Pr is excited. Excitation of generator Pr using a pulse current source causes pushers 5 of metal resonator 4 in generator Pr to bend and straighten at the resonant frequency of metal resonator 4. This causes the pushers 5 of the metal resonator in generator Pr to interact with upper contact portion 19B. As described above, contact portions 19A and 19B are mechanically coupled. Furthermore, generator Pr and output shaft 12B are also mechanically coupled. Additionally, since generator Ps is not excited, the elastic bent pushers 5 of the metal resonator 4 in generator Ps are frictionally coupled with lower contact portion 19A. As a result of the excitation of generator Pr, the pushers 5 in the metal resonator 4 in generator Pr apply force to upper contact portion 19B. However, since upper contact portion 19B which is fixed in position by the frictional coupling of generator Ps and lower contact portion, 19A, contact portion 19B resists any radial movement. Instead, the force causes the rotation of the metal resonator, resulting in the tubular output shaft 12 revolving around the centering rod 13 in a backward direction which is the reverse of the previously specified direction A typical motor as the one described above in FIG. 3, with a maximum power consumption of 6 W, would provide the following performance characteristics when powered by a pulsed-current source with an output voltage of approximately 12 V:

| | |
|---|---|
| Q-factor of the oscillator | 1000 |
| Angular resolution (arc-sec) | 0.1-0.4 |
| Maximum torque (Nm) | 0.5-5 |
| Self-braking torque (Nm) | 0.5-5 |
| Maximum angular speed (revolutions per minute) | up to 60 |
| Velocity dynamic range (orders of magnitude) | 5-6 |
| Response time (microseconds) | 20-50 |
| Positioning drift (arc-sec per hour) | 1-2 |
| Time to accelerate to max speed (milliseconds) | 0.3-0.5 |
| Reversal time (milliseconds) | 0.6-1 |

Applicant has presented certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A piezoelectric generator, comprising:
an active source of zero-order radial mode vibration in the form of a piezoelectric ring having upper and lower plane surfaces and a first quality factor (Q-factor);
a sound-wave conducting gasket acoustically coupled to the upper plane surface;
a single metal resonator ring acoustically coupled to the conducting gasket, the metal resonator ring having a second Q-factor substantially greater than the first Q-factor;
at least one bent elastic pusher extending from a periphery of the metal resonator ring; and
wherein an external diameter of the conducting gasket is less than half of an external diameter of the metal resonator ring, and wherein said piezoelectric ring, said conducting gasket, and said metal resonator ring are concentrically aligned with respect to a rotational axis.

2. The piezoelectric generator of claim 1, wherein a frequency of a zero-order mode of radial vibration for the piezoelectric ring and a frequency of a zero-order mode of radial vibration for the metal resonator ring are substantially equal.

3. The piezoelectric generator of claim 2, wherein a difference between a natural frequency ($F_{cmr}$) of the zero-order vibration mode of the metal resonator ring and a natural frequency ($F_{as}$) of the zero-order vibration mode of the piezoelectric ring is less than 20 kHz.

4. A piezoelectric generator, comprising:
a piezoelectric ring having upper and lower plane surfaces and a first quality factor (Q-factor);
a sound-wave conducting gasket acoustically coupled to the upper plane surface.
a single metal resonator ring positioned acoustically coupled to the conducting gasket, the metal resonator ring having a second Q-factor substantially greater than the first Q-factor;
at least one bent elastic pusher extending from a periphery of the metal resonator ring; and
wherein an external diameter of the conducting gasket is less than half of an external diameter of the metal resonator ring, and wherein said piezoelectric ring, said conducting gasket, and said metal resonator ring are concentrically aligned with respect to a rotational axis; and
wherein a width ($b_g$) of the sound-conducting gasket, a width ($B_{pr}$) of the piezoelectric ring, and a width ($B_{cmr}$) of the metal resonator ring satisfy the following conditions: $3b_g \leq B_{pr}$, and $3b_g \leq B_{cmr}$.

5. A piezoelectric generator, comprising:
a piezoelectric ring having upper and lower plane surfaces and a first quality factor (Q-factor);
a sound-wave conducting gasket acoustically coupled to the upper plane surface;
a metal resonator ring positioned acoustically coupled to the conducting gasket, the metal resonator ring having a second Q-factor substantially greater than the first Q-factor;
at least one bent elastic pusher extending from a periphery of the metal resonator ring; and
wherein an external diameter of the conducting gasket is less than half of an external diameter of the metal resonator ring, and wherein said piezoelectric ring, said conducting gasket, and said metal resonator ring are concentrically aligned with respect to a rotational axis; and
wherein an external radius ($R_{as}$) and an internal radius ($r_{as}$) of the piezoelectric ring and an external radius ($R_{cmr}$)

and an internal radius ($r_{cmr}$) of the metal resonator ring are selected to satisfy the following condition:

$$V_{ssp}/(R_{as}+r_{as}) \leq v_{ssm}(R_{cmr}+r_{cmr}),$$

where $v_{ssp}$ is the speed of sound in the piezoelectric ring, and $v_{ssm}$ is the speed of sound in the metal resonator ring.

6. The piezoelectric generator according to claim 1, wherein the piezoelectric ring comprises a material selected from the group consisting of barium titanate, lead titanate, sodium tantalate, potassium tantalate, lead zirconate-titanate, lead-strontium zirconate-titanate, barium-lead zirconate-titanate, and strontium zirconate-titanate.

7. A piezoelectric motor, comprising:
a support;
a stator extending from the support and defining a rotational axis;
an active source of zero-order radial mode vibration in the form of a piezoelectric generator rigidly coupled to the stator, comprising a piezoelectric ring having upper and lower plane surfaces and a first quality factor (Q-factor), a sound-wave conducting gasket acoustically coupled to the upper plane surface, a single metal resonator ring acoustically coupled to the conducting gasket, the metal resonator ring having a second Q-factor substantially greater than the first Q-factor, and one or more bent elastic pushers extending from a periphery of the metal resonator ring; and
a rotor rotatably and mechanically coupled to the stator, said rotor having a rotor inner circumferential surface,
wherein an external diameter of the conducting gasket is less than half of an external diameter of the metal resonator ring, wherein said piezoelectric ring, said conducting gasket, and said metal resonator ring are concentrically aligned with respect to the rotational axis, wherein said bent elastic pushers contact the rotor inner circumferential surface of the rotor, and wherein the stator and the support are acoustically isolated from the piezoelectric generator.

8. The piezoelectric motor of claim 7, wherein the bent elastic pushers comprise at least two bent elastic pushers positioned at substantially equal spacings around the periphery of the metal ring resonator.

9. The piezoelectric motor of claim 7, wherein a frequency of a zero-order mode of radial vibration for the piezoelectric ring and a frequency of a zero-order mode of radial vibration for the metal resonator ring are substantially equal.

10. The piezoelectric motor of claim 9, wherein a difference between a natural frequency ($F_{cmr}$) of the zero-order vibration mode of the metal resonator ring and a natural frequency ($F_{as}$) of the zero-order vibration mode of the piezoelectric ring is less than 20 kHz.

11. A piezoelectric motor, comprising:
a support;
a stator extending from the support and defining a rotational axis;
a piezoelectric generator rigidly coupled to the stator, comprising a piezoelectric ring having upper and lower plane surfaces and a first quality factor (Q-factor), a sound-wave conducting gasket acoustically coupled to the upper plane surface, a single metal resonator ring acoustically coupled to the conducting gasket, the metal resonator ring having a second Q-factor substantially greater than the first Q-factor, and one or more bent elastic pushers extending from a periphery of the metal resonator ring; and
a rotor rotatably and mechanically coupled to the stator, said rotor having a rotor inner circumferential surface,
wherein an external diameter of the conducting gasket is less than half of an external diameter of the metal resonator ring, wherein said piezoelectric ring, said conducting gasket, and said metal resonator ring are concentrically aligned with respect to the rotational axis wherein said bent elastic pushers contact the rotor inner circumferential surface of the rotor, and wherein the stator and the support are acoustically isolated from the piezoelectric generator; and
wherein a width ($b_g$) of the sound-conducting gasket, a width ($B_{pr}$) of the piezoelectric ring, and a width ($B_{cmr}$) of the metal resonator ring satisfy the following conditions: $3b_g \leq B_{pr}$, and $3b_g \leq B_{cmr}$.

12. A piezoelectric motor, comprising:
a support;
a stator extending from the support and defining a rotational axis;
a piezoelectric generator rigidly coupled to the stator, comprising a piezoelectric ring having upper and lower plane surfaces and a first quality factor (Q-factor), a sound-wave conducting gasket acoustically coupled to the upper plane surface, a metal resonator ring acoustically coupled to the conducting gasket, the metal resonator ring having a second Q-factor substantially greater than the first Q-factor, and one or more bent elastic pushers extending from a periphery of the metal resonator ring; and
a rotor rotatably and mechanically coupled to the stator, said rotor having a rotor inner circumferential surface,
wherein an external diameter of the conducting gasket is less than half of an external diameter of the metal resonator ring, wherein said piezoelectric ring, said conducting gasket, and said metal resonator ring are concentrically aligned with respect to the rotational axis, wherein said bent elastic pushers contact the rotor inner circumferential surface of the rotor, and wherein the stator and the support are acoustically isolated from the piezoelectric generator; and
wherein an external radius ($R_{as}$) and an internal radius ($r_{as}$) of the piezoelectric ring and an external radius ($R_{cmr}$) and an internal radius ($r_{cmr}$) of the metal resonator ring are selected to satisfy the following condition:

$$v_{ssp}/(R_{as}+r_{as}) \approx v_{ssm}/(R_{cmr}+r_{cmr}),$$

where $v_{ssp}$ is the speed of sound in the piezoelectric ring, and $v_{ssm}$ is the speed of sound in the metal resonator ring.

13. The piezoelectric motor of claim 7, wherein the piezoelectric ring comprises a material selected from the group consisting of barium titanate, lead titanate, sodium tantalate, potassium tantalate, lead zirconate-titanate, lead-strontium zirconate-titanate, barium-lead zirconate-titanate, and strontium zirconate-titanate.

14. A piezoelectric motor, comprising:
a support;
a stator extending from the support and defining a rotational axis;
an active source of zero-order radial mode vibration in the form of a first piezoelectric generator rigidly coupled to the stator and having one or more first bent elastic pushers extending radially with respect to said rotational axis;
an output shaft rotatably and mechanically coupled to the stator;
an active source of zero-order radial mode vibration in the form of a second piezoelectric generator rigidly coupled to the output shaft and having one or more second bent elastic pushers extending radially with respect to said rotational axis, a frictional coupler rotatably and mechanically coupled to the output shaft, said coupler having an upper inner circumferential surface and a lower inner circumferential surface, wherein each of said first and said second piezoelectric generators comprise a piezoelectric ring having upper and lower plane surfaces and a first quality factor (Q-factor), a sound-wave conducting gasket acoustically coupled to the upper plane surface, and a single metal resonator ring acoustically coupled to the conducting gasket and having a second Q-factor substantially greater than the first Q-factor, an external diameter of the conducting gasket being less than half of an external diameter of the metal resonator ring, wherein said piezoelectric ring, said conducting gasket, and said metal resonator ring in each of said first and second piezoelectric generators are concentrically aligned with respect to the rotational axis, and wherein the stator and the support are acoustically isolated from the first and second piezoelectric generators.

15. The piezoelectric motor of claim 14, in which the friction coupler comprises a upper contact portion and a lower contact portion separated by one sound-proof gasket, said lower contact portion frictionally engaged with the first elastic pushers and said upper contact portion frictionally engaged with the second elastic pushers.

16. The piezoelectric motor of claim 14, wherein at least one of said first and said second elastic pushers comprise at least two bent elastic pushers positioned at substantially equal spacings.

17. The piezoelectric motor of claim 14, wherein for each of said first and second piezoelectric generators, a frequency of a zero-order mode of radial vibration for the piezoelectric ring and a frequency of a zero-order mode of radial vibration for the corresponding metal resonator ring are substantially equal.

18. The piezoelectric motor of claim 17, wherein a difference between a natural frequency ($F_{cmr}$) of the zero-order vibration mode of the metal resonator ring and a natural frequency ($F_{as}$) of the zero-order vibration mode of the corresponding piezoelectric ring is less than 20 kHz.

19. A piezoelectric motor, comprising:

a support;

a stator extending from the support and defining a rotational axis;

a first piezoelectric generator rigidly coupled to the stator and having one or more first bent elastic pushers extending radially with respect to said rotational axis;

an output shaft rotatably and mechanically coupled to the stator;

a second piezoelectric generator rigidly coupled to the output shaft and having one or more second bent elastic pushers extending radially with respect to said rotational axis, a frictional coupler rotatably and mechanically coupled to the output shaft, said coupler having an upper inner circumferential surface and a lower inner circumferential surface, wherein each of said first and said second piezoelectric generators comprise a piezoelectric ring having upper and lower plane surfaces and a first quality factor (Q-factor), a sound-wave conducting gasket acoustically coupled to the upper plane surface, and a single metal resonator ring acoustically coupled to the conducting gasket and having a second Q-factor substantially greater than the first Q-factor, an external diameter of the conducting gasket being less than half of an external diameter of the metal resonator ring, wherein said piezoelectric ring, said conducting gasket, and said metal resonator ring in each of said first and second piezoelectric generators are concentrically aligned with respect to the rotational axis, and wherein the stator and the support are acoustically isolated from the first and second piezoelectric generators; and wherein for each of said first and second piezoelectric generators, a width ($b_g$) of the sound-conducting gasket, a width ($B_{pr}$) of the corresponding piezoelectric ring, and a width ($B_{cmr}$) of the corresponding metal resonator ring satisfy the following conditions: $3b_g \leq B_{pr}$, and $3b_g \leq B_{cmr}$.

20. A piezoelectric motor, comprising:

a support;

a stator extending from the support and defining a rotational axis;

a first piezoelectric generator rigidly coupled to the stator and having one or more first bent elastic pushers extending radially with respect to said rotational axis;

an output shaft rotatably and mechanically coupled to the stator;

a second piezoelectric generator rigidly coupled to the output shaft and having one or more second bent elastic pushers extending radially with respect to said rotational axis, a frictional coupler rotatably and mechanically coupled to the output shaft, said coupler having an upper inner circumferential surface and a lower inner circumferential surface, wherein each of said first and said second piezoelectric generators comprise a piezoelectric ring having upper and lower plane surfaces and a first quality factor (Q-factor), a sound-wave conducting gasket acoustically coupled to the upper plane surface, and a metal resonator ring acoustically coupled to the conducting gasket and having a second Q-factor substantially greater than the first Q-factor, an external diameter of the conducting gasket being less than half of an external diameter of the metal resonator ring, wherein said piezoelectric ring, said conducting gasket, and said metal resonator ring in each of said first and second piezoelectric generators are concentrically aligned with respect to the rotational axis, and wherein the stator and the support are acoustically isolated from the first and second piezoelectric generators; and wherein for each of said first and second piezoelectric generators, an external radius ($R_{as}$) and an internal radius ($r_{as}$) of the piezoelectric ring and an external radius ($R_{cmr}$) and an internal radius ($r_{cmr}$) of the corresponding metal resonator ring are selected to satisfy the following condition:

$$v_{ssp}/(R_{as}+r_{as}) \leq v_{ssm}/(R_{cmr}+r_{cmr}),$$

where $v_{ssp}$ is the speed of sound in the piezoelectric ring, and $v_{ssm}$ is the speed of sound in the corresponding metal resonator ring.

* * * * *